United States Patent Office 3,696,074
Patented Oct. 3, 1972

3,696,074
COPOLYAMIDE FROM (a) DODECAMETHYLENE DIAMINE, (b) HEXAMETHYLENE DIAMINE, (c) TEREPHTHALIC ACID AND (d) ADIPIC ACID
Yoshizo Tsuda and Akinori Yamamoto, Otsu, Japan, assignors to Toray Industries, Inc., Tokyo, Japan
Filed Mar. 24, 1970, Ser. No. 22,273
Claims priority, application Japan, Mar. 25, 1969, 44/22,072
Int. Cl. C08g 20/20
U.S. Cl. 260—78 R   7 Claims

ABSTRACT OF THE DISCLOSURE

A novel copolyamide useful as a textile fiber is synthesized from (a) dodecamethylenediamine, (b) hexamethylenediamine, (c) terephthalic acid and (d) adipic acid.

GENERAL FIELD OF THE INVENTION

This invention relates to a novel copolyamide and to a textile fiber produced therefrom having a high degree of crystallinity, a high tenacity, an increased Young's modulus, improved dimensional stability, a high glass transition temperature and good dyeability with acidic dyestuffs.

DISCUSSION OF THE PRIOR ART

Heretofore, it has been suggested for the purpose of increasing the initial Young's modulus of polyamide fibers, to include in the polymerization mixture reactants having aromatic rings or alicyclic rings. For example, polyamides have been suggested which are obtained by polymerizing aromatic dicarboxylic acids with aliphatic diamines or aliphatic dicarboxylic acids, such diamines having an aromatic ring or an alicyclic ring. However, almost all of these copolymers have presented problems in view of high cost of raw material, difficulty of spinning or poor photo-resistance.

It has been known that among these aromatic or alicyclic polyamides, such as polyterephthalamides, have good properties except for difficulty of their melt-spinning. Polyterephthalamides obtained by polymerization of terephthalic acid and aliphatic diamines having 11 or more carbon atoms were melt-spinnable but had melting points of about 300° C. Accordingly, the polymerization and spinning of these polyamides had to be conducted at elevated temperatures which caused problems of gelation and discoloration.

In order to improve these problems of polyterephthalamides, a copolymerization method has been suggested which caused a lowering of the melting point of the copolymer while retaining a high degree of crystalliinty, both of which were necessary for synthetic fiber applications. Specifically, the copolyamide obtained from the copolymerization method was composed of (a) 10–90 mol percent of polymethyleneterephthalamide such as undecamethyleneterephthalamide, dodecamethyleneterephthalamide and tridecamethyleneterephthalamide, (b) 0–45 mol percent hexamethyleneterephthalamide and (c) 0–65 mol percent hexamethyleneadipamide, wherein the quantity of each amide component complies with the formula $$(a)+(b)+(c)=100$$

wherein (a), (b) and (c) respectively represent the contents of polymethyleneterephthalamide, hexamethyleneterephthalamide and hexamethyleneadipamide expressed as mol percentages (Japanese patent publication No. 43–11829). In fact, this copolyamide has good properties for melt-spinning and drawing. However, this copolyamide still presented unsolved problems. When this copolymer was composed of (a) and (b), fiber produced from this copolymer had poor dyeability because of its excessively high glass transition temperature. When this copolymer was composed of (a), (b) and (c) as an additional component in order to decrease the glass transition, the copolymer had decreased crystallinity and poor fiber qualities, and its property in hot wet condition was poor. The fiber produced from the copolymer had poor dimensional stability. It was difficult to twist the fiber and to obtain a textured yarn of excellent properties.

When this copolymer was composed of (a) and (c), it had a low crystallinity and did not exhibit good properties as an aromatic polyamide.

SUMMARY OF THE INVENTION

It has been found that copolyamides which have melting points sufficiently low for spinning of fibers may be composed of (1) diamine components consisting of (a) dodecamethylenediamine and (b) hexamethylenediamine and (2) dicarboxylic acid components consisting of (c) terephthalic acid and (d) adipic acid, wherein the percentage by mol of each component is within the scope of the formulae:

$a+b=100$
$b+c\leqq 95$
$c+d=100$
$115\leqq a+c\leqq 175$, $b\geqq 5$ wherein $a$, $b$, $c$ and $d$ respectively represent the contents of dodecamethylenediamine, hexamethylenediamine, terephthalic acid and adipic acid expressed as mol percentages. The fibers produced from these copolyamides exhibit a low boiling water shrinkage, high tensile strength, a high initial Young's modulus and a low degree of moisture absorption, as well as good dyeability with acidic dyestuffs. Because of their high degree of crystallinity, the fibers also have excellent heat setting properties.

DETAILED DESCRIPTION OF THE INVENTION

Figure 1:
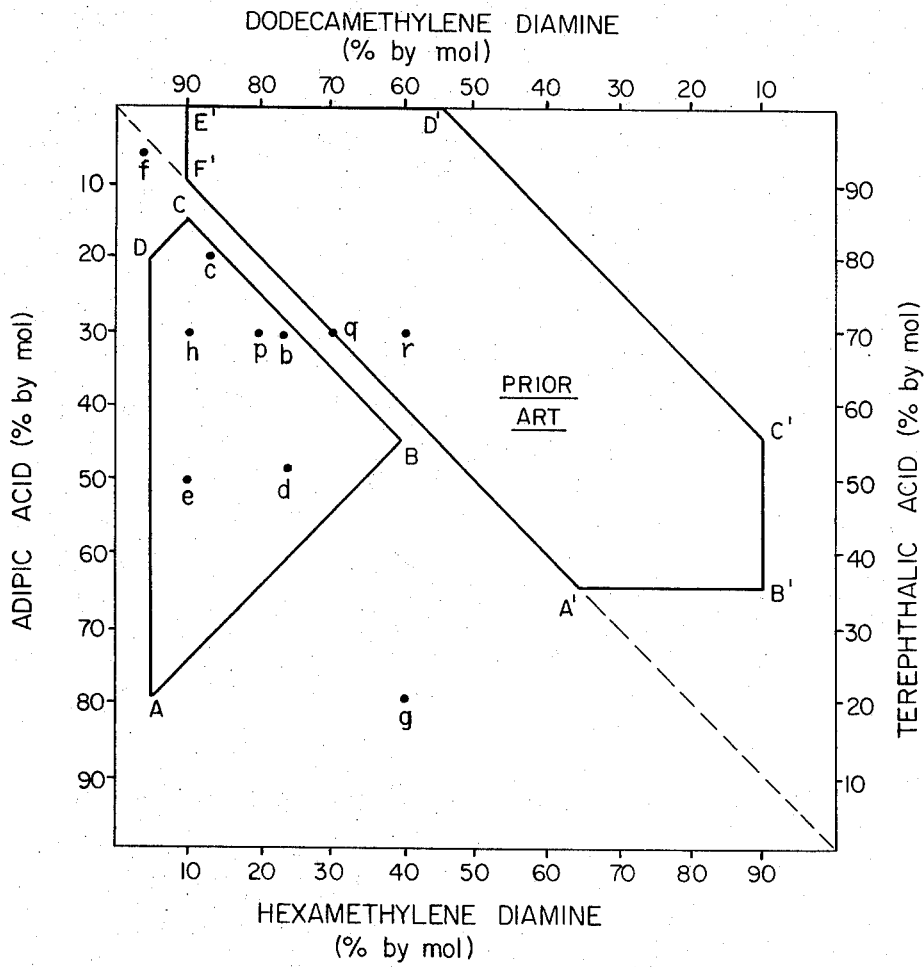
FIG. 1 is a tetraaxial graph showing the copolyamide compositions included within the scope of the present invention and comparing these with the prior art such as Japanese patent publication No. 43–11829.

Polyamides consisting mainly of dodecamethyleneterephthalamide have melting points of about 300° C. which is too high to allow the polymer to melt and flow. At ordinary melt polymerization temperatures, the polymers tend to gel and to discolor. Furthermore, it is difficult to convert the undrawn fiber to a drawn fiber of high tenacity.

However, it has been found that when dodecamethylene-terephthalamide is copolymerized with dodecamethyleneadipamide and one amide component selected from the group consisting of hexamethyleneterephthalamide, hexamethyleneadipamide and mixtures thereof within specific ratios, the copolyamide thus obtained has good crystallinity and has a melting point of 200–280° C. Polyamide filaments obtained by melt-spinning and drawing the spun fiber have a high degree of orientation, a high tensile strength, a high Young's modulus, good dimensional stability, a low degree of moisture absorption and good dyeability with acidic dyestuffs.

The present invention relates to a copolyamide which consists essentially of (1) diamine components of (a) dodecamethylenediamine and (b) hexamethylenediamine and (2) dicarboxylic acid components of (c) terephthalic acid and (d) adipic acid, wherein the mol percentage of each component is within the scope of the formulae:

$a+b=100$
$b+c\leq 95$
$c+d=100$
$115\leq a+c\leq 175, b\geq 5$ wherein $a$, $b$, $c$ and $d$ respectively represent the contents of dodecamethylenediamine, hexamethylenediamine, terephthalic acid and adipic acid expressed as mol percentages.

In regard to the composition of the present invention, the amount of dodecamethylenediamine present should always be larger than the amount of terephthalic acid present as described in "Discussion of the Prior Art." Further, the formula of $b\geq 5$ is an important limitation. Because when (b) is less than 5 mol percent in this diamine component, the copolyamide thus obtained has excessively high crystallinity to permit drawing the fiber. The limitation of the formula of $b+c\leq 95$ is also important. When the sum of (b) and (c) is more than 95 mole percent the copolyamide thus obtained has poor dyeability and sometimes cannot be manufactured into fiber and tends to decrease in crystallinity and to increase in degree of moisture absorption. Furthermore, the limitation of the formula of $115\leq a+c\leq 175$ is important because, when the sum of (a) and (c) is less than 115 mol percent, the copolyamide thus obtained has a low degree of crystallinity, and the fiber produced therefrom does not have a high tensile strength, a high Young's modulus or good dimensional stability. On the other hand when the sum of (a) and (c) is more than 175 mol percent the copolyamide thus obtained has excessively high crystallinity to permit drawing the fiber. Therefore, the copolymer of the present invention should have a composition within the zone ABCD of FIG. 1 which graphically defines the scope of the formulae:

$a+b=100$
$b+c\leq 95$
$c+d=100$
$115\leq a+c\leq 175, b\geq 5$ wherein $a$, $b$, $c$ and $d$ respectively represent the contents of dodecamethylenediamine, hexamethylenediamine, terephthalic acid and adipic acid expressed as mol percentages.

In FIG. 1, the point A, the point B, the point C and the point D respectively represent the compositions of [95 mol percent dodecamethylenediamine (DMDA), 5 mol percent hexamethylenediamine (HMDA), 20 mol percent terephthalic acid (TPA), 80 mol percent adipic acid (AA)], [60 mol percent DMDA, 40 mol percent HMDA, 55 mol percent TPA, 45 mol percent AA], [90 mol percent DMDA, 10 mol percent HMDA, 85 mol percent TPA, 15 mol percent AA], [95 mol percent DMDA, 5 mol percent HMDA, 80 mol percent TPA, 20 mol percent AA]. The copolymer of Japanese patent publication No. 43-11829 has a composition within the zone A'B'C'D'E'F' of FIG. 1 and is marked "Prior Art."

The copolyamide of the present invention is synthesized by the method which comprises (1) mixing (a) dodecamethylenediamine, (b) hexamethylenediamine, (c) terephthalic acid and (d) adipic acid with a specific mixing ratio in the presence of water, wherein the specific mixing ratio is within the scope of the formulae:

$a+b=100$
$b+c\leq 95$
$c+d=100$
$115\leq a+c\leq 175, b\geq 5$ wherein $a$, $b$, $c$ and $d$ respectively represent the amounts of dodecamethylenediamine, hexamethylenediamine, terephthalic acid and adipic acid expressed as mole percentages and (2) polymerizing the mixture at the elevated temperature under pressure. The amount of water used in this method was 30–150% based on weight of the sum of nylon salts.

Polymerization temperature 260–300° C.
Pressure employed in this method 10–20 kg./cm.²

However, it is preferable to use a mixture of nylon salts produced from the reaction of these diamines with these dicarboxylic acids instead of the mixture of the diamines and the dicarboxylic acid. The mixture of nylon salts consist of (x) dodecamethylene diammonium terephthalate (y) dodecamethylene diammonium adipate and a member selected from the group consisting of (z) hexamethylene diammonium terephthalate, (w) hexamethylene diammonium adipate and mixtures thereof. In this mixture of nylon salts, the ratio of the amount of each diamine and dicarboxylic acid should be within the same ratio as employed in the above mentioned method. When this ratio is within the zone ABCD in FIG. 1, the mixing ratio of these nylon salts will be naturally limited. Specifically, in this method, dodecamethylene diammonium terephthalate (12 T salt), dodecamethylene diammonium adipate (12 6 salt) and a member selected from the group consisting of hexamethlyene diammonium terephthalate (6 T salt), hexamethylene diammonium adipate (6–6 salt) and mixture thereof are mixed in the following mol ratio:

(i) When using 12 T salt, 12–6 salt and 6–6 salt:
 (x) 20–85 mole percent 12 T salt
 (y) 5–75 mole percent 12–6 salt
 (w) 5–40 mole percent 6–6 salt with the sume of (x), (y) and (w) being 100.

(ii) When using 12 T salt, 12–6 and 6 T salt:

$(x_2)$ 15–75 mole percent 12 T salt
 $(y_2)$ 15–80 mol percent 12–6 salt
 $(z_2)$ 5–40 mole percent 6 T salt with the sum of $(x_2)$, $(y_2)$ and $(z_2)$ being 100.

(iii) When using 12 T salt, 12–6 salt, 6–6 salt and 6 T salt:

$(x_3)$ 15–80 mole percent 12 T salt
 $(y_3)$ 5–80 mol percent 12–6 salt
 $(z_3)$ 5–40 mole percent 6 T salt
 $(w_3)$ 5–40 mol percent 6–6 salt with the sum of $(x_3)$, $(y_3)$, $(z_3)$ and $(w_3)$ being 100.

The nylon salts are blended in a reactor, to which water and a viscosity control agent are added as required. The reaction is conducted under pressure in an inert gas atmosphere such as nitrogen or carbon dioxide. It is preferable to limit the reaction temperature to 300° C. in order to avoid gelation. However, it is possible to raise the polymerization temperature at the final stage of the polymerization to more than 300° C. in order to facilitate the extrusion of the polymer from the reactor. During the polymerization, the pressure may be kept at 10–20 atms. In some cases it is of advantage to carry out the later stages of the polymerization reaction under a reduced pressure in order to limit the degree of polymerization. In the present invention, generally a polymer having an inherent viscosity of 0.5–2.0, preferably 0.6 to 1.5 is utilized. In order to obtain such polymer, it is preferable to use a viscosity control agent. The preferred viscosity control agents are carboxylic acid compounds such as terephthalic acid and benzoic acid, amine compounds such as hexamethylenediamine, dodecamethylenediamine, xylylene diamine, dodecyl amine and cyclohexyl amine, and combinations thereof. Further, inorganic compounds such as titanium oxide and kaolinite, antioxidants, or photo-resistant agents may be used as well as in conventional methods of producing polyamide.

The copolymer thus obtained has a melting point of 200 to 285° C., a glass transition temperature of 50 to 120° C., a high degree of crystallinity and a low degree of moisture absorption.

When the polycondensate is melt-spun by conventional methods, filaments having good drawability are obtained. A melt-spinning temperature below 320° C. is generally used in order to avoid the undesired discoloration of the product.

The drawing of the filaments is normally carried out over a pin and/or a plate heated above a temperature of about 60° C. below the softening point of the polymer in the dry or wet state, or in steam heated at a temperature of about 60 to 150° C. The filaments are drawn to a ratio of at least 2 times, preferably 3 to 7 times, their original length.

The drawn filaments have a tenacity of at least 2 g./d., an initial Young's modulus of at least 30 g./d., a shrinkage in boiling water of at most 12%, a glass transition temperature in the saturated wet state of 30–80° C. and good dyeability with acidic dyestuffs. Further, the drawn filaments have photo and thermal stability at least equal to nylon 6 or nylon 6—6.

Because of these characteristics, when the fibers of the present invention are employed in knitted goods or woven fabrics, the products exhibit good dyeability, excellent dimensional stability, a high bending modulus, "wash and wear" properties, and non-discoloration. When the drawn fibers are treated by heat in the relaxed state, the silk-like fibers are manufactured without much decrease in tenacity or initial Young's modulus. Further, it is possible to manufacture the fiber having a shrinkage in boiling water of below 3% by this treatment. Silk-like woven fabrics can be obtained from this treated fiber. When the fibers of this invention are used in textured yarn or as a conjugate fiber with other polyamide fibers, such as nylon 6 and nylon 6—6, high bulk yarns are obtained. The fibers in the form of filaments and staple are also useful in clothing, interior goods, beddings, carpeting and industrial yarns and fabrics such as tire cord.

The present invention is further illustrated by the following examples in which the physical properties of the copolyamides were measured by the following methods:

(i) Inherent viscosity

The polymer was dissolved in concentrated sulfuric acid and the concentration of the polymer was adjusted to 0.5%. Inherent viscosity was measured at 30° C.

(ii) Melting point

A small piece of the polymer was heated under a polarizing microscope equipped with a heating plate. The melting point was taken as the temperature at which polarized light disappeared.

(iii) Shrinkage in boiling water

A sample yarn in a relaxed state was boiled in water for 30 minutes. The length of the yarn before and after the treatment was measured under a load of 50 mg./d. and the degree of shrinkage was calculated.

(iv) Initial Young's modulus

A sample yarn conditioned at a temperature of 20° C. and relative humidity of 65% was pulled at the speed of 100% per minute. The initial Young's modulus was obtained from the gradient of the initial part of the stress-strain curve.

EXAMPLE 1

Forty-three parts by weight dodecamethylene diammonium terephthalate (12 T salt), 36 parts by weight dodecamethylene diammonium adipate (12–6 salt), 21 parts by weight hexamethylene diammonium terephthalate (6 T salt), 0.1 part by weight benzoic acid, as a viscosity control agent, and 66 parts by weight water were well mixed. The mixture was charged into an autoclave and air inside the autoclave was replaced by nitrogen gas. The mixture was heated to 280° C. When the internal pressure reached 10 kg./cm.$^2$, condensed water which was formed by polymerization was discharged little by little, retaining the pressure for 3 hours. Thereafter, the internal pressure was reduced to atmospheric pressure for 1 hour by increasing the amount of condensate discharged. All the while (polymerization) temperature was kept at about 280° C. Further, the temperature was kept at about 280° C. for 1 hour under atmospheric pressure, and the internal pressure was reduced for about 15 minutes. The polymer thus obtained was extruded in the form of gut and was cut to chips. The polymer was colorless and stiff, having a melting point of 245° C. Its viscosity was 770 poises at 280° C., and its inherent viscosity was 0.69. The composition of this polymer, by molar ratio, was TPA/AA/DMDA/HMDA=65/35/75/25. In the figure, point (a) represents this composition.

This polymer was melted at 270° C., extruded through a spinneret having six orifices, each diameter being 0.3 mm., and wound up to form undrawn filaments. The filament thus obtained was subsequently drawn to 4.5 times its original length on a hot plate at 150° C. The colorless drawn yarn thus produced was an aromatic nylon yarn having 38 denier, and had a tenacity of 4.6 g./d., an elongation of 18%, an initial Young's modulus of 41 g./d., and a shrinkage in boiling water of 8.5%. Further, this drawn yarn was treated in a relaxed state in boiling water for 30 minutes and then dried. As measured in a standard state, this yarn had a tenacity of 3.9 g./d., an elongation of 26% and an initial Young's modulus of 32 g./d.

Comparatively, a drawn yarn of nylon 6—6 treated with the same operations had an initial Young's modulus of 21 g./d.

Further, when said drawn yarn was treated in a relaxed state on a plate heated at 200° C. to shrink it to 0.9 times its length, the yarn thus treated had a tenacity of 3.0 g./d., an elongation of 27%, an initial Young's modulus of 32 g./d. and a shrinkage in boiling water of 3%.

On the other hand, when a similar polymerization was carried out using a mixture of 56 parts by weight 12 T salt, 28.5 parts by weight 12–6 salt and 15.5 parts by weight 6—6 salt, the copolymer had the same composition as the above mentioned polymer and had a melting point of 245° C. Both two polymers presented the same infrared spectrum.

EXAMPLE 2

Fifty parts by weight of 12 T salt, 30 parts by weight 12–6 salt, 20 parts by weight 6 T salt and 0.1 part by weight benzoic acid, as a viscosity control agent, were mixed. The mixture was charged into an autoclave and polymerized by a method similar to claim 1. A copolymer was thus obtained having a melting point of 263° C., an inherent viscosity of 0.78, stiffness and good crystallinity.

An undrawn monofilament was produced from the copolymer by the same methods as in Example 1, but at 280° C., and was drawn to 5.6 times its original length on a plate heated at 150° C. A drawn yarn having a tenacity of 6.7 g./d., an elongation of 11%, an initial Young's modulus of 53 g./d. and a shrinkage in boiling water of 9.9% was obtained.

This copolymer had a composition consisting of 70 mol percent TPA, 30 mol percent AA, 76 mol percent DMDA and 24 mol percent HMDA. In the figure, point (b) represents this composition.

EXAMPLE 3

Seventy parts by weight 12 T salts, 20 parts by weight 12–6 salts, 10 parts by weight 6 T salts and 0.1 part by weight benzoic acid, as a viscosity control agent, were well mixed. The mixture was charged into an autoclave and a similar polymerization operation as Example 1 was carried out, but when the polymerization finished the polymerization temperature was 295° C. The copolymer thus obtained had good crystallinity, a melting point of 273° C., and an inherent viscosity of 0.96.

An undrawn monofilament was produced from the copolymer by the same method as in Example 1 but at 295°

C. Said monofilament was drawn to 5 times its original length on a plate heated at 150° C. A drawn yarn thus obtained had a tenacity of 5.0 g./d., an elongation of 13%, an initial Young's modulus of 44 g./d. and a shrinkage in boiling water of 9.6%.

When said drawn yarn was treated in a relaxed state in boiling water from 30 minutes and dried, the yarn thus treated had a tenacity of 5.0 g./d., an elongation of 25% and an initial Young's modulus of 34 g./d.

This copolymer had a composition consisting of 80 mol percent TPA, 20 mol percent AA, 87 mol percent DMDA and 13 mol percent HMDA. In the figure, point (c) represents this composition.

EXAMPLE 4

Thirty parts by weight 12 T salt, 50 parts by weight 12–6 salt, 20 parts by weight 6 T salt and 0.1 part by weight benzoic acid, as a viscosity control agent, were well mixed, and the mixture was charged into an autoclave. A similar polymerization operation as Example 1 was carried out. The copolymer thus obtained had a good crystallinity, a melting point of 238° C. and an inherent viscosity of 0.64. An undrawn monofilament was obtained in Example 1. Said monofilament was drawn to 4.7 times its original length on a plate heated at 150° C. A drawn yarn thus obtained had a tenacity of 4.2 g./d., an elongation of 11.3%, an initial Young's modulus of 46 g./d., a shrinkage in boiling water of 8.6%. When said drawn yarn was treated in a relaxed state in boiling water for 30 minutes and dried, the yarn thus treated had a tenacity of 3.7 g./d., an elongation of 20¢ and an initial Young's modulus of 35 g./d.

This copolymer had a composition consisting of 51.5 mol percent TPA, 48.5 mol percent AA, 76 mol percent DMDA and 24 mol percent HMDA. In the figure, point (d) represents this composition.

EXAMPLE 5

52.7 parts by weight 12 T salt, 39.9 parts by weight 12–6 salt, 7.46 parts by weight 6—6 salt, 0.1 part by weight benzoic acid, as a viscosity control agent, and 100 parts by weight water were charged into an autoclave, and a similar polymerization operation as Example 1 was carried out. The copolymer thus obtained had a melting point of 250° C., an inherent viscosity of 0.69, good crystallinity, and a composition consisting of 50 mol percent TPA, 50 mol percent AA, 90 mol percent DMDA and 10 mol percent HMDA. In the figure, point (e) represents said composition.

A copolymer having the same composition was obtained by polymerizing 8 parts by weight 6 T salt, 47 parts by weight 12-T salt and 45 parts by weight 12–6 salt using the same operation as above. The melting point of this copolymer was 250° C., and both copolymers represented the same infrared spectrum.

A drawn monofilament was produced from the copolymer by the same method as Example 1 but at 280° C. Said monofilament was drawn to 5 times its original length on a plate heated at 150° C. A drawn yarn thus obtained had a tenacity of 5.4 g./d., an elongation of 18.1%, an initial Young's modulus of 42 g./d., and a shrinkage in boiling water of 7.6%.

COMPARATIVE EXAMPLE 1

91.2 parts by weight 12 T salt, 5.8 parts by weight 12–6 salt, 3.0 parts by weight 6—6 salt, 0.1 part by weight benzoic acid and 100 parts by weight water were charged into an autoclave, and a similar polymerization operation as Example 1 was carried out, but the polymerization temperature was 300° C., and without extrusion, the polymer was put out as a mass. The copolymer thus obtained had a melting point of 298° C. and an inherent viscosity of 1.77. The copolymer did not flow until it was heated to 330° C. While heating at 330° C., decomposition and gelation of the copolymer were observed. The resulting undrawn yarn could not be drawn. This copolymer had a composition consisting of 94 mol percent TPA, 64 mol percent AA, 96 mol percent DMDA and 4 percent HMDA. In the figure, point (f) represents this composition.

COMPARATIVE EXAMPLE 2

Thirty-three parts by weight 6 T salt, 24 parts by weight 6—6 salt, 43 parts by weight 12–6 salt, 0.1 part by weight benzoic acid and 100 parts by weight water were charged into an autoclave, and a similar polymerization operation as Example 1 was carried out. The copolymer thus obtained had a melting point of 190° C., an inherent viscosity of 0.74 and a low crystallinity. No drawn yarn having good properties could be obtained from the copolymer because of its low melting point and its low crystallinity.

This copolymer had a composition consisting of 20 mol percent TPA, 80 mol percent AA, 60 mol percent DMDA ando 40 mol percent HMDA. In the figure, point (g) exhibits this composition.

EXAMPLE 6

Seven hundred and thirty-four parts by weight dodecamethylene diammonium terephthalate, 347 parts by weight dodecamethylene diammonium adipate, 90.5 parts by weight hexamethylene diammonium terephthalate, 784 parts by weight water, 40.1 parts by weight dodecamethylenediamine and 16.3 parts by weight benzoic acid were well mixed. The mixture was charged into a reaction vessel and air inside the vessel was replaced by nitrogen gas. When the mixture was heated to 210° C. and the internal pressure reached 10 kg./cm.$^2$, condensed water which was formed by polymerization was discharged little by little, retaining the pressure for 2 hours. While discharging the water, the polymerization temperature was elevated to 270° C. Thereafter, the internal pressure was reduced to atmospheric pressure for 2 hours gradually and the temperature was elevated to 285° C. Further, the temperature was kept at 285° C. for 1 hour under atmospheric pressure while charging nitrogen gas into the vessel, and then the internal pressure was reduced to 500 mm. Hg for about 30 minutes. Furthermore the internal pressure was increased to 4 kg./cm.$^2$ by charging nitrogen gas into the vessel, and then the polymer thus obtained was molded to the form of gut through the orifice of the vessel and was cut into chips. The chip was colorless and transparent. The polymer had a melting point of 263° C., a melt viscosity of 1030 poises at 300° C., an inherent viscosity of 0.90 and terminal amino group of $11 \times 10^{-5}$ mol/g.

These chips were melted at 300° C., extruded through a spinneret having 24 orifices and wound up to form undrawn filaments with the velocity of 900 m./minute. The filament thus obtained was subsequently drawn to 3.31 times its original length with a pin at 80° C. and over a hot plate at 150° C. The white drawn yarn thus produced was an aromatic nylon yarn having 70 denier, and had a tenacity of 4.5 g./d., an elongation of 20%, an initial Young's modulus of 51 g./d. and a shrinkage in boiling water of 8.3%. When this yarn was dyed with an aqueous solution of acidic dyestuffs (Xylene Flast Blue PR) having a pH of 3.1 at 100° C., its absorption of dyestuff was 100% and it was dyed an excellent deep color.

The composition of this polymer, by molar ratio, was TPA/AA/DMDA/HMDA=70/30/90/10. In the figure, point (h) represents this composition.

EXAMPLE 7

Three kinds of polymer were produced by the similar method of Example 1. A small piece of each polymer was melted in the Differential Scanning Colorimeter in nitrogen gas atmosphere, and a peak temperature of a melting point of a polymer (Tm) was measured. Further, a polymer was kept for 5 minutes at 40–50° C. higher temperature than its melting point, and then it was cooled with the velocity of 40° C./minutes and a heat of crystallization of a polymer and a peak temperature of crystallization were measured.

The following table exhibits the result:

| Polymer point of figure | Composition | | | | Heat of crystallization (cal./g.) | Peak temperature of crystallization Tc (° C.) | Peak temperature of melting point Tm (° C.) |
|---|---|---|---|---|---|---|---|
| | DMDA | HMDA | TPA | AA | | | |
| p[1] | 80 | 20 | 70 | 30 | 8.3 | 213 | 266 |
| q[2] | 70 | 30 | 70 | 30 | 7.5 | 190 | 239 |
| r[2] | 60 | 40 | 70 | 30 | 5.9 | 170 | 239 |

[1] Polymer included within the scope of the invention.
[2] Polymer outside the scope of this invention.

The copolymer consisting of 70 mol percent 12 T and 30 mol percent 12-6 has a heat of crystallization of 8.1 cal./g. and the copolymer consisting of 70 mol percent 6 T and 30 mol percent 66 has a heat of crystallization of 10-11 cal./g. When DMDA decreases and correspondingly HMDA increases in this series of the copolymer, a heat of crystallization decreases. This phenomenon shows the decrease of crystallinity. Therefore, the copolymer of present invention has a better crystallinity than the prior art.

The following is claimed:

1. A fiber forming copolyamide consisting essentially of repeating units of (1) diamine components of (a) dodecamethylenediamine and (b) hexamethylenediamine and (2) dicarboxylic acid components of (c) terephthalic acid and (d) adipic acid, wherein the mol percentage of each component is within the scope of the formula:

$a+b=100$
$b+c \leq 95$
$c+d=100$
$115 \leq a+c \leq 175, b \geq 5$ wherein $a$, $b$, $c$ and $d$ respectively represent the contents of dodecamethylenediamine, hexamethylenediamine, terephthalic acid and adipic acid expressed as mol percentages.

2. The fiber forming copolyamide according to claim 1 wherein said copolyamide is a terpolymer which consists essentially of about 20 to 85 mol percent dodecamethyleneadipamide repeating units and about 5 to 40 mol percent hexamethyleneadipamide repeating units with the remainder of said copolyamide being dodecamethyleneterephthalamide repeating units.

3. The fiber forming copolyamide according to claim 1, wherein said copolyamide consists essentially of about 15 to 75 mol percent dodecamethyleneterephthalamide repeating units, about 15 to 80 mol percent dodecamethyleneadipamide repeating units and about 5 to 40 mol percent hexamethyleneterephthalamide repeating units.

4. The fiber forming copolyamide according to claim 1, wherein said copolyamide is a terpolymeer which consists of about 15 to 80 mol percent dodecamethyleneadipamide, repeating units, about 5 to 40 mol percent hexamethyleneterephthalamide repeating units with the remainder of said terpolymer being dodecamethyleneterephthalamide repeating units.

5. The fiber forming copolyamide according to claim 1 having a melting point of about 200 to 280° C.

6. A fiber consisting essentially of the copolyamide according to claim 1.

7. The fiber according to claim 6 having a melting point of about 200 to 280° C., an initial Young's modulus of at least about 30 g./d., a shrinkage in boiling water of at most about 12%, a glass transition temperature in the saturated wet state of about 30 to 80° C.

References Cited
UNITED STATES PATENTS

| 2,252,554 | 8/1941 | Carothers | 260—78 R |
| 3,492,368 | 1/1970 | Coover et al. | 260—78 R |
| 3,475,387 | 10/1969 | Carter et al. | 260—78 R |

HAROLD D. ANDERSON, Primary Examiner

U.S. Cl. X.R.

8—178 R; 57—140 R; 161—227; 260—30.8 R, 78 S; 264—210 F